United States Patent Office 2,944,042
Patented July 5, 1960

2,944,042

RUBBER COMPOSITION AND PREPARATION THEREOF

Herbert R. Anderson, Jr., Bartlesville, Okla., assignor to Phillips Petroleum Company, a corporation of Delaware No Drawing. Filed Mar. 10, 1958, Ser. No. 720,026

19 Claims. (Cl. 260—41.5)

This invention relates to rubbers containing sulfides of metals selected from group VI-A of the periodic table. In one aspect, it relates to sulfides of metals of group VI-A of the periodic table employed as a reinforcing agent in rubber compositions.

This application is a continuation-in-part of my copending application S.N. 600,371, filed July 27, 1956.

I have found, quite surprisingly, that natural and synthetic rubbers can be compounded with a sulfide of a metal of group VI-A of the periodic table alone or in admixture with other substances and cured (or vulcanized) to yield a product possessing desirable modulus, tensile strength and/or elongation characteristics.

Accordingly, therefore, one or more of the following objects will be obtained by the practice of my invention.

One object of this invention is to provide a novel rubber composition comprising a sulfide of a metal of group VI-A of the periodic table.

Another object of this invention is to provide a novel rubber composition containing a reinforcing amount of a sulfide of a group VI-A metal.

A further object of this invention is to produce novel rubbers containing a sulfide of a group VI-A metal, useful for decorative purposes.

A further object of this invention is to provide novel rubbers containing a sulfide of group VI-A metal possessing desirable modulus, tensile, and/or elongation characteristics.

A still further object of this invention is to prepare novel rubbers containing a sulfide of a group VI-A metal as the reinforcing agent, or said sulfide admixed with conventional reinforcing agents.

Other objects will become apparent to those skilled in the art upon the reading of my disclosure.

Broadly, my invention relates to rubbers compounded with a reinforcing quantity of a sulfide of a group VI-A metal, such as, molybdenum sulfide (MoS), molybdenum sesquisulfide ($Mo_2S_3$), molybednum disulfide ($MoS_2$), molybdenum trisulfide ($MoS_3$), molybdenum tetrasulfide ($MoS_4$), molybdenum pentasulfide ($Mo_2S_5$), tungsten disulfide ($WS_2$), tungsten trisulfide ($WS_3$), uranium sulfide (US), uranium sesquisulfide ($U_2S_3$), uranium disulfide ($US_2$), chromium sulfide (CrS), chromium sesquisulfide ($Cr_2S_3$), chromium disulfide ($CrS_2$), chromium tritetrasulfide ($Cr_3S_4$), chromium tetraheptasulfide ($Cr_4S_7$) and chromium hemiheptasulfide ($Cr_2S_7$). The preferred reinforcing agents are molybdenum disulfide and tungsten disulfide.

The group VI-A metal sulfide can be the sole reinforcing agent or it can be admixed with carbon black or a mineral pigment such as clay, silica, kaolin, calcium silicate, titanium dioxide, hydrated alumina, calcined magnesia, calcium carbonate, zinc sulfide, zinc oxide, or other conventional fillers well recognized in the art.

As a practical matter, the amount of group VI-A metal sulfide employed will generally be governed by the type of product desired. The amount of sulfide required to impart the desired characteristics to the finished product is readily determinable by those skilled in the rubber compounding art. Generally, when the sulfide is utilized as the sole reinforcing agent, the amount employed will be in the range from about 25 to about 400 parts by weight per 100 parts of rubber, preferably from about 25 to about 250. When using molybdenum disulfide and tungsten disulfide the preferred quantities are from about 25 to about 150 and from about 40 to about 250, respectively.

The group VI-A metal sulfide can be admixed with other well-known reinforcing agents such as the various carbon blacks and mineral pigments of the type illustrated above preferably in an amount wherein at least 10 percent by weight of the total reinforcing admixture is the sulfide. The total reinforcing admixture will generally be in the range of about 25 to 400, and higher, parts by weight per 100 parts of rubber, preferably from about 25 to about 250.

The rubbers applicable in this invention are natural or synthetic rubbers with Mooney values (ML-4) generally ranging from about 10–125, or higher, preferably in the range from about 10–75. The natural and synthetic rubbers are well known to chemists skilled in the rubber art. The synthetic rubbers can be prepared in any manner known in the art, such as mass or emulsion polymerization. One suitable method is the emulsion polymerization of conjugated diolefins alone or with other copolymerizable monomers at 0° to 140° F. in such systems as the iron-pyrophosphate, either sugar-free or containing sugar, and the persulfate recipes. Any suitable emulsifier such as a fatty or rosin acid soap or the like can be used. These recipes usually contain 1–9 parts by weight of the emulsifier per 100 parts of monomer.

The synthetic rubbers may be homopolymers of conjugated dienes or copolymers of conjugated dienes with a compound containing an active $CH_2{=}C{<}$ group which is copolymerizable therewith. Conjugated dienes which can be employed are those containing at least 4 carbon atoms per molecule such as 1,3-butadiene, isoprene, piperylene, methylpentadiene, 2,3-dimethyl-1,3-butadiene, chloroprene, 2,3-dimethyl-1,3-hexadiene, 2,3-diethyl-1,3-octadiene, and the like. The various alkoxy and cyano derivatives such as 2-methoxy-3-ethylbutadiene, 2-ethoxy-3-ethyl-1,3-hexadiene, 2-cyano-1,3-butadiene, and the like are applicable. The monomer copolymerizable with the above diene can be any monomer containing an active $CH_2{=}C{<}$ group such as aryl olefins, esters of acrylic and substituted acrylic acids, nitriles, amides, ketones, and vinylpyridines. Examples of such monomers include, among others, styrene, alpha-methylstyrene, p-chlorostyrene, p-methoxystyrene, acrylonitrile, methacrylonitrile, methyl methacrylate, butyl methacrylate, methacrylamide, methyl isopropenyl ketone, 2-vinylpyridine, 2-methyl-5-vinylpyridine, 3-ethyl-5-vinylpyridine, and the like.

The group VI-A metal sulfide is incorporated into the rubber stocks as a fine powder and imparts a gray metallic appearance to the finished product. When employed as a fine powder the sulfide particles are relatively large as compared with other reinforcing agents such as the carbon blacks. The reinforcing characteristics of the sulfide are equivalent to the soft carbon blacks. The smaller the sulfide particle size, the more pronounced are the reinforcing characteristics in rubber stocks. The non-porous sulfide will generally have a surface area greater than one square meter per gram, and preferably greater than 5 square meters per gram. The group VI-A metal sulfide containing rubbers are useful for decorative purposes such as molding on the dashboards of automobiles, in the homes, etc. These rubbers are also useful as gasket stock, and in the manufacture of automobile tires.

When employed as a reinforcing agent in synthetic rubber, e.g., in cold butadiene/styrene rubber, the group VI-A metal sulfides give a stock which has a higher modulus, higher hot tensile strength and higher aged tensile strength than a similar stock in which a carbon black having a similar surface area to the sulfides is employed. It also shows good reinforcing characteristics in natural rubber and hot GR-S and other types of rubbers.

The technique of compounding rubbers is well known in the art. By way of illustration, the group VI-A metal sulfide reinforcing agent can be incorporated into the rubber by mill mixing along with other compounding ingredients or by a latex masterbatching operation wherein an aqueous slurry of the mineral pigment is generally prepared first and then mixed with the latex. After all ingredients have been incorporated into the rubber, the composition is vulcanized or cured by heating for a period sufficient to cure.

The following examples are illustrated merely to represent various embodiments of my invention, and these examples are not to be construed as limiting the scope of the invention.

EXAMPLE I

A 75/25 butadiene/styrene rubber was prepared by emulsion polymerization at 41° F. to give a polymer having a raw Mooney value (ML-4) of 52 and a bound styrene content of 20 percent. A typical recipe for the production of a polymer of this type is as follows:

Table I

| | Parts by weight |
|---|---|
| Butadiene | 75 |
| Styrene | 25 |
| Water | 180 |
| Rosin soap, potassium salt | 4.5 |
| Tamol N [1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecyl mercaptan as required for a 52 ML-4 rubber. | |

[1] Sodium salt of a naphthalene sulfonic acid condensed with formaldehyde.

The rubber was compounded using as reinforcing agents molybdenum disulfide and two different carbon blacks having a surface area similar to the molybdenum disulfide. The compounding recipes were as follows:

Table II

| | Parts by Weight | | |
|---|---|---|---|
| | 1 | 2 | 3 |
| Rubber | 100 | 100 | 100 |
| Molybdenum disulfide | [1] 131.4 | | |
| Thermax [2] | | [1] 50.0 | |
| P-33 [3] | | | [1] 51.7 |
| Zinc oxide | 3 | 3 | 3 |
| Stearic acid | 1 | 1 | 1 |
| Flexamine [4] | 1 | 1 | 1 |
| Sulfur | 1.75 | 1.75 | 1.75 |
| Santocure [5] | 1 | 1.1 | 1.1 |

[1] The weights of filler used provided an equal volume in each stock (approximately 27.8 cc. per 100 grams rubber).
[2] Medium thermal carbon black.
[3] Fine thermal carbon black.
[4] Physical mixture containing 65 percent of a complex diarylamine-ketone reaction product and 35 percent of N,N'-diphenyl-p-phenylene-diamine.
[5] N-cyclohexyl-2-benzothiazylsulfenamide.

The stocks were compounded on a roll mill, cured 30 minutes at 307° F. and physical properties determined. Results were as follows:

Table III

| | Recipes | | |
|---|---|---|---|
| | Molybdenum Disulfide | Thermax | P-33 |
| Unaged Samples: | | | |
| Compression set, percent | 16.5 | 19.1 | 17.8 |
| 300% Modulus, p.s.i. (80° F.) | 1,420 | 460 | 410 |
| Tensile, p.s.i. (80° F.) | 1,820 | 2,410 | 3,350 |
| Elongation, percent (80° F.) | 570 | 720 | 785 |
| 200 F. Maximum tensile, p.s.i. | 900 | 250 | 300 |
| Δ T°, F | 61.9 | 41.9 | 44.6 |
| Resilience, percent | 65.8 | 71.9 | 69.3 |
| Shore hardness | 60 | 48 | 48 |
| Compounded MS-1½, 212 F. | 30.5 | 29.5 | 28.5 |
| Gehman freeze point, C | -50 | -51 | -48 |
| Surface area of reinforcing agent, m.²/g | 7.1 | 7.5 | 13.7 |
| Oven Aged 24 Hours at 212 F: | | | |
| 300 percent Modulus, p.s.i. (80° F.) | 1,575 | 820 | 600 |
| Tensile, p.s.i. (80° F.) | 1,700 | 1,120 | 1,160 |
| Elongation, percent (80° F.) | 330 | 380 | 480 |
| Δ T°, F | 56.8 | 31.1 | 36.5 |
| Resilience, percent | 72.9 | 78.4 | 75.6 |

It is apparent that the oven aged molybdenum disulfide-containing sample possessed superior modulus, tensile and elongation characteristics to either the Thermax- or P-33-containing samples.

EXAMPLE II

The butadiene-styrene rubber described in Example I was compounded in accordance with the following recipes using molybdenum disulfide as a filler.

Table IV

| | Parts by weight |
|---|---|
| Rubber | 100 |
| Molybdenum disulfide | 140 |
| Zinc oxide | 3 |
| Santocure [1] | 1 |
| Sulfur | 1.75 |
| Flexamine [1] | 1 |
| Stearic acid | 1 |

[1] As in Example I.

Stocks were compounded on a roll mill, cured at 307° F., and physical properties determined. The following results were obtained in two different cure times.

Table V

| Cure time at 307 F, min | 15 | 45 |
|---|---|---|
| Swell, $V_r$ [1] | 0.3983 | 0.4242 |
| Shore Hardness | 64 | |
| 300 percent Modulus, p.s.i. (80° F.) | 1,640 | 1,930 |
| Tensile, p.s.i. (80° F.) | 2,030 | 2,220 |
| Elongation, percent (80° F.) | 480 | 420 |
| NBS Abrasion Index [2] | 2.81 | |

[1] In heptane; $V_r$ = volume fraction of polymer in swollen gel.
[2] Revolutions/mil. A National Bureau of Standards abrader was employed using No. 2½ garnet paper (ASTM D-394-47, adopted 1940, revised 1946, 1947). All samples were extracted 3 days with ethanol-toluene azeotrope and were then dried in vacuum for a week.

EXAMPLE III

A 71/29 butadiene/styrene rubber was prepared by emulsion polymerization at 122° F. to give a polymer having a raw Mooney value (ML-4) of 48 and a bound styrene content of 23.5 percent. A typical recipe for the production of the polymer of this type is as follows:

Table VI

| | Parts by weight |
|---|---|
| Butadiene | 71 |
| Styrene | 29 |
| Water | 180 |
| Sodium fatty acid soap | 4.3 |
| $K_2S_2O_8$ | 0.3 |
| Dodecyl mercaptan as required for a 48 ML-4 rubber. | |

The rubber was compounded using molybdenum disulfide, a mixture of molybdenum disulfide and Philblack O* carbon black, and Philblack O* carbon black as reinforcing agents. The following compounding recipes were employed:

Table VII

|  | Parts by weight | | |
|---|---|---|---|
|  | 1 | 2 | 3 |
| Rubber | 100 | 100 | 100 |
| Molybdenum disulfide | 140 | 10 |  |
| Philblack O |  | 50 | 50 |
| Zinc oxide | 3 | 3 | 3 |
| Sulfur | 1.75 | 1.75 | 1.75 |
| Santocure [1] | 0.8 | 0.8 | 0.8 |

[1] As in Example I.

The stocks were compounded on a roll mill, cured at 307° F., and physical properties determined. The following results were obtained at two different cure times:

Table VIII

| Reinforcing Agent | Cure Time, Min. | 300% Modulus, p.s.i. | Tensile, p.s.i. | Elongation, percent | NBS Abrasion Index [1] |
|---|---|---|---|---|---|
| Molybdenum disulfide | 15 | 1,330 | 1,460 | 370 | 3.37 |
| Do | 45 | 1,420 | 1,370 | 290 | 2.88 |
| Philblack O+MoS$_2$ | 15 | 1,280 | 2,600 | 540 | 9.05 |
| Do | 45 | 1,380 | 2,250 | 450 | 7.12 |
| Philblack O | 15 | 1,000 | 2,050 | 500 | 11.11 |
| Do | 45 | 1,100 | 1,900 | 440 | 8.56 |

[1] As in Example II.

It will be noted that the sample containing Philblack O* plus molybedenum disulfide yielded a cured rubber possessing increased tensile and elongation properties as compared to the rubber containing solely Philblack O* carbon black or molybdenum disulfide.

EXAMPLE IV

Molybdenum disulfide was employed as a reinforcing agent for natural rubber (#1, Smoked Sheet). A control run was made using Philblack O* carbon black as the reinforcing agent. The following compounding recipes were employed.

Table IX

|  | Parts by Weight | |
|---|---|---|
|  | 1 | 2 |
| Natural rubber | 100 | 100 |
| Molybdenum disulfide | 140 |  |
| Philblack O |  | 50 |
| Zinc oxide | 4 | 4 |
| Stearic acid | 3 | 3 |
| Sulfur | 2 | 2 |
| Santocure [1] | 0.5 | 0.5 |
| Phenyl-beta-naphthylamine | 1 | 1 |

[1] As in Example I.

The stocks were compounded on a roll mill, cured 30 minutes at 307° F. and physical properties determined. Results were as follows:

Table X

|  | Molybdenum Disulfide | Philblack O |
|---|---|---|
| 300% Modulus, psi (80° F.) | 1,870 | 1,490 |
| Tensile, p.s.i. (80° F.) | 3,150 | 3,032 |
| Elongation, Percent (80° F.) | 470 | 470 |
| Swell, V$_r$ [1] | 0.321 | 0.300 |

[1] As in Example II.

* Phillips Petroleum Co. trademark; high abrasion furnace black.

It is apparent that the rubber stock containing molybdenum disulfide as the reinforcing agent possesses properties which are at least comparable to the rubber stock containing Philblack O* carbon black.

EXAMPLE V

A 75/25 butadiene/styrene rubber was prepared by emulsion polymerization at 41° F. to give a polymer having a raw Mooney value (ML–4) of 52 and a bound styrene content of 20 percent. A typical recipe for the production of a polymer of this type is as follows:

Table XI

|  | Parts by weight |
|---|---|
| Butadiene | 75 |
| Styrene | 25 |
| Water | 180 |
| Rosin soap, K salt | 45 |
| Tamol N [1] | 0.15 |
| Na$_3$PO$_4$·12H$_2$O | 0.80 |
| p-Menthane hydroperoxide | 0.12 |
| FeSO$_4$·7H$_2$O | 0.20 |
| K$_4$P$_2$O$_7$ | 0.30 |
| Tert-dodecyl mercaptan | as required for a 52 rubber ML–4. |

[1] Sodium salt of a naphthalene sulfonic acid condensed with formaldehyde.

The rubber was compounded using as reinforcing agents tungsten disulfide and a medium thermal carbon black (Thermax, a Vanderbilt Co. product). Compounding recipes were as follows:

Table XII

|  | Parts by Weight | |
|---|---|---|
|  | 1 | 2 |
| Rubber | 100 | 100 |
| Tungsten Disulfide [1] | 210 |  |
| Thermax [2] |  | 50 |
| Zinc Oxide | 3 | 3 |
| Stearic Acid | 1 | 1 |
| Flexamine [3] | 1 | 1 |
| Sulfur | 2.3 | 1.75 |
| Santocure [4] | 1 | 1 |

[1] Tungsten disulfide as received was wet ball milled (in water) for 7 days, dried in a vacuum oven, and chunks were crushed. Material crumbled easily. Surface area of product was 2.1 sq. meters/gram. The amount of WS$_2$ employed was equivalent in volume to the 50 parts of carbon black.
[2] Surface area, 7.5 sq. meters/gram.
[3] Physical mixture containing 65 percent of a complex diarylamine-ketone reaction product and 35 percent of N,N'-diphenyl-p-phenylenediamine.
[4] N-cyclohexyl-2-benzothiazylsulfenamide.

The stocks were compounded on a roll mill, cured to as near the same level of crosslinks as practicable, and physical properties determined. Results were as follows:

Table XIII

|  | Run 1 | Run 2 |
|---|---|---|
| Cure times, minutes | 60 | 30 |
| Cure temperature, F. | 307 | 307 |
| $\nu \times 10^4$, moles/cc. [1] | 1.95 | 1.68 |
| 300% modulus, p.s.i. | 1,110 | 660 |
| Tensile, p.s.i. | 1,530 | 1,550 |
| Elongation, Percent | 530 | 530 |
| Surface/volume ratio [2] | 15.7 | 13.5 |

[1] The density of network chains is related to the number of crosslinks by the function $$\nu = 2n - \frac{2\delta}{M}$$

where $n$ is the number of crosslinks, $\delta$ is the density of the polymer, and $M$ is the molecular weight.
[2] Amount of surface available for interaction between the reinforcing agent and rubber.

These data show that there is an improvement in modulus when the stock contained tungsten disulfide, while the other physical properties remained substantially the same.

EXAMPLE VI

Natural rubber was compounded using as reinforcing agents tungsten disulfide and a medium thermal carbon black (Thermax) as described in Example V. Compounding recipes were as follows:

*Table XIV*

|  | Parts by Weight | |
|---|---|---|
|  | 1 | 2 |
| Rubber | 100 | 100 |
| Tungsten disulfide [1] | 210 | |
| Thermax [1] | | 50 |
| Zinc oxide | 4 | 4 |
| Stearic acid | 3 | 3 |
| Sulfur | 2.0 | 2.0 |
| Santocure [1] | 0.5 | 0.5 |

[1] As in Example V.

The stocks were compounded on a roll mill, cured to as near the same level of cross links as practicable, and physical properties determined. Results were as follows:

*Table XV*

|  | Run 1 | Run 2 |
|---|---|---|
| Cure time, minutes | 45 | 27 |
| Cure temperature, F | 280 | 280 |
| $\nu \times 10^4$, moles/cc [1] | 1.15 | 1.21 |
| 300% modulus, p.s.i | 1,280 | 840 |
| Tensile, p.s.i | 2,470 | 4,110 |
| Elongation, percent | 480 | 770 |
| Surface/volume ratio [1] | 15.7 | 13.5 |

[1] As in Example V.

The presence of tungsten disulfide substantially improves the modulus of natural rubber.

EXAMPLE VII

The butadiene/styrene rubber described in Example V was compounded using as reinforcing agents a mixture of tungsten disulfide and a high abrasion furnace black (Philblack O, Phillips Petroleum Co. trademark), and furnace black alone. Compounding recipes were as follows:

*Table XVI*

|  | Parts by Weight | |
|---|---|---|
|  | 1 | 2 |
| Rubber | 100 | 100 |
| Tungsten disulfide [1] | 105 | |
| Philblack O [2] | 25 | 50 |
| Zinc oxide | 3 | 3 |
| Stearic acid | 1 | 1 |
| Flexamine [1] | 1 | 1 |
| Sulfur | 1.75 | 1.75 |
| Santocure [1] | 1 | 1 |

[1] As in Example V.
[2] Surface area, 75.1 sq. meters/gram.

In run 1 the amount of tungsten disulfide added was equivalent in volume to 25 parts of carbon black, thus making the total volume of reinforcing agent in run 1 equivalent to that in run 2.

The stocks were compounded on a roll mill, cured to as near the same level of crosslinks as practicable, and physical properties determined. Results were as follows:

*Table XVII*

|  | Run 1 | Run 2 |
|---|---|---|
| Cure time, minutes | 45 | 28 |
| Cure temperature, F | 307 | 307 |
| $\nu \times 10^4$, moles/cc [1] | 1.50 | 1.68 |
| 300% modulus, p.s.i | 1,270 | 1,850 |
| Tensile, p.s.i | 3,050 | 4,180 |
| Elongation, percent | 660 | 560 |

[1] As in Example V.

The furnace black employed is known to be an excellent reinforcing agent for rubber and would be expected to be superior to tungsten disulfide since it had a surface area of 75.1 sq. meters/gram while that of the tungsten disulfide was 2.1 sq. meters/gram. The data show, however, that a very good product is obtained when half of the furnace black is replaced by tungsten disulfide.

As will be evident to those skilled in the art, various modifications of this invention can be made, or followed, in the light of the foregoing disclosure, without departing from the spirit or scope of said disclosure.

I claim:

1. A vulcanized rubber composition comprising a rubbery component selected from the group consisting of natural rubber, a homopolymer of a conjugated diene, a copolymer of a conjugated diene and a compound containing an active $CH_2=C<$ group which is copolymerizable therewith, said conjugated diene containing at least 4 carbon atoms per molecule, and a reinforcing amount of a sulfide of a group VI-A metal, added to said rubber before vulcanization.

2. A composition according to claim 1 in which the sulfide is a molybdenum sulfide.

3. A rubber composition according to claim 2 wherein the rubber composition contains from about 25 to about 250 parts by weight of molybdenum disulfide per 100 parts of rubbery component.

4. A rubber composition according to claim 2 wherein the rubber component possesses a Mooney value (ML—4) in the range from about 10 to 125.

5. A vulcanized rubber composition comprising a rubbery component selected from the group consisting of a natural rubber, a homopolymer of a conjugated diene, a copolymer of a conjugated diene and a compound containing an active $CH_2=C<$ group which is copolymerizable therewith, said conjugated diene containing at least 4 carbon atoms per molecule, and reinforced with a reinforcing amount of reinforcing agent comprising molybdenum disulfide, added to said rubber before vulcanization.

6. A rubber composition according to claim 5 wherein said reinforcing agent comprises at least 10 weight per cent molybdenum disulfide, based on the total reinforcing agent, admixed with a mineral pigment.

7. A rubber composition according to claim 5 wherein said reinforcing agent is molybdenum disulfide admixed with carbon black.

8. A rubber composition according to claim 7 wherein said admixture of molybdenum disulfide and carbon black comprises at least 10 weight percent molybdenum disulfide based on the said admixture.

9. A rubber composition according to claim 5 wherein said reinforcing agent is molybdenum disulfide.

10. A rubber composition according to claim 9 wherein the rubbery component possesses a Mooney value (ML-4) in the range from about 10 to about 75.

11. A rubber composition according to claim 10 wherein the rubbery component is a homopolymer of butadiene.

12. A rubber composition according to claim 11 wherein the rubbery component is a copolymer of butadiene and styrene.

13. A vulcanized rubber composition comprising a rubbery component selected from the group consisting of a natural rubber, a homopolymer of a conjugated diene, a copolymer of a conjugated diene and a compound containing an active $CH_2=C<$ group which is copolymerizable therewith, said conjugated diene containing at least 4 carbon atoms per molecule, and reinforced with a reinforcing amount of reinforcing agent comprising tungsten disulfide, added to said rubber before vulcanization.

14. A rubber composition according to claim 13 wherein said reinforcing agent comprises at least 10 weight percent tungsten disulfide, based on the total reinforcing agent, admixed with a mineral pigment.

15. A rubber composition according to claim 13 wherein said reinforcing agent is tungsten disulfide admixed with carbon black.

16. A rubber composition according to claim 15 wherein said admixture of tungsten disulfide and carbon black comprises at least 10 weight percent tungsten disulfide based on the said admixture.

17. The process of producing a novel rubber composition which comprises incorporating into a rubber selected from the group consisting of natural rubber, a synthetic homopolymer of a conjugated diene, and a synthetic copolymer of a conjugated diene and a compound containing an active $CH_2=C$ group which is copolymerizable therewith, said conjugated diene containing at least 4 carbon atoms per molecule, compounding ingredients comprising a sulfide of a group VI-A metal, curing said mixture under curing conditions, and recovering a rubber characterized by improved modulus, tensile and elongation characteristics.

18. The process of producing a novel rubber composition which comprises incorporating into a rubber selected from the group consisting of natural rubber, a synthetic homopolymer of a conjugated diene, and a synthesis copolymer of a conjugated diene and a compound containing an active $CH_2=C$ group which is copolymerizable therewith, said conjugated diene containing at least 4 carbon atoms per molecule, compounding ingredients comprising molybdenum disulfide, curing said mixture under curing conditions, and recovering a rubber characterized by improved modulus, tensile and elongation characteristics.

19. The process of producing a novel rubber composition which comprises incorporating into a rubber selected from the group consisting of natural rubber, a synthetic homopolymer of a conjugated diene, and a synthetic copolymer of a conjugated diene and a compound containing an active $CH_2=C$ group which is copolymerizable therewith, said conjugated diene containing at least 4 carbon atoms per molecule, compounding ingredients comprising tungsten disulfide, curing said mixture under curing conditions, and recovering a rubber characterized by improved modulus, tensile and elongation characteristics.

No references cited.